Figure 1:
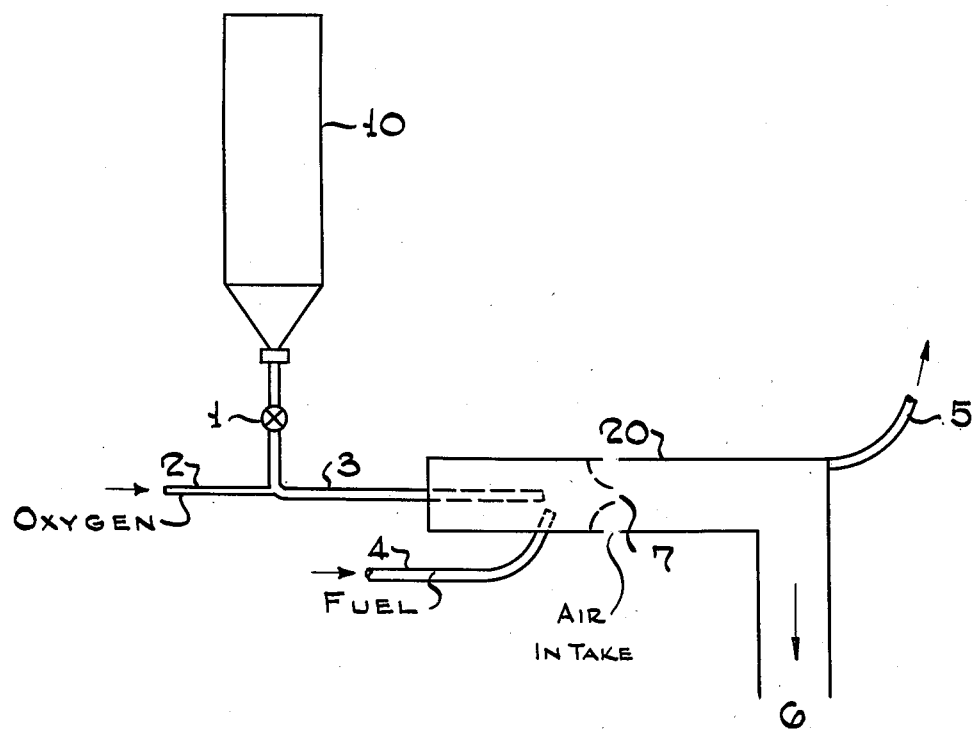

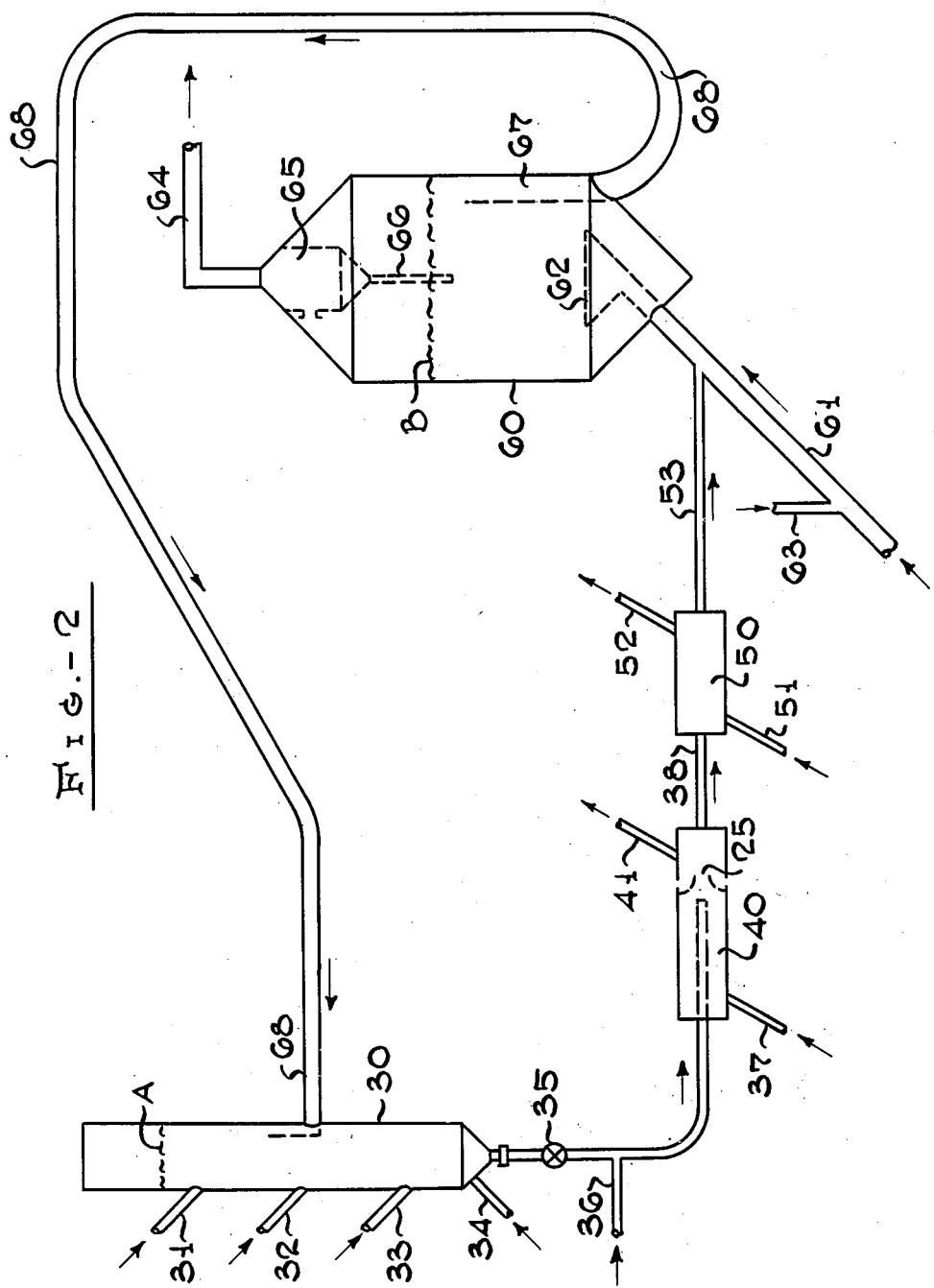

Patented Nov. 15, 1949

2,488,150

UNITED STATES PATENT OFFICE 2,488,150

PREPARATION AND REGENERATION OF A HYDROCARBON SYNTHESIS CATALYST

George H. Walden, Jerry A. Pierce, and Marnell A. Segura, Baton Rouge, La., assignors to Standard Oil Development Company, a corporation of Delaware Application November 8, 1946, Serial No. 708,630

6 Claims. (Cl. 260—449.6)

The present invention is concerned with a process for the preparation of contacting solids. The invention more specifically relates to a process for the preparation of subdivided catalysts suitable for use in fluid type operations. The invention is more particularly directed to an improved process for the preparation of spherical catalysts suitable for use in a hydrocarbon synthesis reaction. In accordance with the present invention improved finely divided contacting solids are prepared by passing a powder or equivalent solid through the flame of a suitable torch under conditions to accomplish sintering of the powder or solid. In accordance with the preferred adaptation of the present invention a fusible powder is employed under conditions to obtain the finely divided contacting solid products as spheres. It is a further object and purpose of the present invention to furnish an economical, rapid and safe process for the oxidation of powders, particularly iron powders for use in the preparation of improved hydrocarbon synthesis catalysts. These latter catalysts are usually prepared by oxidizing iron sulfides at temperatures in the range of about 1600° F. followed by reduction of the iron oxide with hydrogen at temperatures in the range from about 700° F. to about 900° F. Various promoters, as for example, alkali metal carbonates and the like are then added.

It is known in the art to contact gases and solids by passing the gases upwardly through an enlarged contacting zone containing a body of finely divided solids at a controlled velocity to maintain the finely divided solids in the contacting zone in an ebullient quasi-liquid like state. The finely subdivided solids generally have a particle size in the range from about 0 to 200 microns and higher, while the velocity of the upflowing suspending gases is usually in the range from about 0.1 to 5 feet per second. Solid fluid treatin operations of the character described for the contacting of solids and gases have found extensive application in various reduction reactions, polymerization processes, exothermic and endothermic reactions, processes for the carbonization of finely divided coal and similar operations. Specific processes in which the fluid solid technique has been very successfully employed are processes involving the treatment of petroleum oils, such as, catalytic cracking operations, polymerization operations and the like. The fluid technique has also been successfully utilized in synthesis of hydrocarbons such as, the Fischer synthesis reactions both for the production of the synthesis gas itself and for the reaction of the oxides of carbon and hydrogen for the production of higher boiling hydrocarbon constituents. Many processes and methods are employed for the manufacture of finely divided solids suitable for employment in solid fluidized operations. We have now discovered an improved economical, rapid and safe method for producing high quality finely divided contacting solids.

In accordance with our process solids or catalysts are sintered or given a heat treatment by passing the powdered catalyst through the flame of a suitable torch. Our invention is particularly adapted for use in conjunction with an improved hydrocarbon synthesis process wherein an iron type catalyst is utilized in the reaction zone in the fluidized state. Our invention is also particularly adapted for producing a high quality, uniform grade of spherical contacting solids. Our invention may be more readily understood by reference to the attached drawings illustrating adaptations of the same. Fig. 1 illustrates an adaptation of our invention wherein fluidized solids are passed under controlled conditions through the flame of a torch. Fig. 2 illustrates a modification of our invention with respect to an improved hydrocarbon synthesis reaction.

Referring specifically to Fig. 1 fusible powder, which for the purpose of illustration is taken to be fine powdered aluminum oxide and iron powder, is withdrawn from zone 10, passed through control valve 1 and mixed with oxygen or an oxygen containing gas which is introduced into the system by line 2. This mixture is introduced into zone 20 by means of line 3. A suitable fuel as for example hydrogen, methane, butane or other hydrocarbon gas or natural gas is introduced into zone 20 by means of line 4. These gases flow through nozzle 7 producing a torch flame the temperature of which is in the range from about 2500° F. to 3500° F. Combustion gases are withdrawn from zone 20 by means of line 5 while the powder is withdrawn by means of conduit 6.

The operation described in Fig. 1 is simple and requires no expensive equipment. By operating as described, it is possible to secure excellent temperature control as the temperature of the flame is dependent only on the type and quantity of fuel used. For example if a relatively high temperature is desired hydrogen is employed while if a lower temperature is desired another fuel is utilized. By process described, it is possible to process a powder into spherical particles without agglomeration and without any change in particle size. Thus, it is possible by our process to eliminate secondary grinding and classification steps.

The operation described with respect to Fig. 1 may be somewhat varied. For example, the fusible powder may be mixed with the promoter in a dry state in which case the promoter should be in such a fine state of subdivision that it clings to the coarser particles of base material as the mixture passes through the torch. In general if dry state mixing is employed it is desirable that the promoter have a micron size below about 10 and that the micron size of the base powder to be fused be in the range from about 20 to 80 and above. In no case should the powder comprise particles of a concentration greater than 20% below about 20 microns. Another adaptation of the process described with respect to Fig. 1 is to impregnate the fusible powder with a soluble compound of the promoter and then to dry the impregnated powder prior to passing the same through the flame. Satisfactory salts are for example aluminum nitrate, alkali metal carbonates and the like. Another adaptation is to fuse the powder and then to impregnate the fused powder after it has been processed in the flame. Again referring to Fig. 1 sintered pyrites ash (95% $Fe_2O_3$) may be charged to zone 10 and fed into zone 20 as heretofore described. Thus by subjecting this iron type hydrocarbon synthesis catalyst to a high temperature the material benefits of a high temperature treatment are secured in a very short period of time.

Referring specifically to Fig. 2, which illustrates an adaptation of our invention with respect to a hydrocarbon synthesis operation, carbonized iron secured as hereinafter described is maintained in zone 30. The carbonized iron is preferably maintained in a fluid ebullient state, the upper level of the bed of which is at point A. Suspending gases which may comprise nitrogen or inert gas is introduced at various points in the bed by means of lines 31, 32, 33 and 34 respectively. The carbonized iron is withdrawn from zone 30 through control valve 35 and mixed with oxygen or other oxygen containing gas which is introduced into the system by means of line 36.

The mixture is introduced into burning zone 40. Methane or any other suitable fuel may be introduced into zone 40 by means of line 37. The carbonized iron is oxidized in the torch 25, withdrawn from zone 40 by means of line 38 and introduced into a reducing zone 50 wherein the oxidized iron is reduced by means of hydrogen which is introduced by means of line 51. The reaction gases are withdrawn from zone 50 by means of line 52. Combustion gases are withdrawn from zone 40 by means of line 41.

The reduced iron is withdrawn from zone 50 by means of line 53 and introduced into hydrocarbon synthesis reaction zone 60. This is preferably accomplished by introducing the reduced iron with synthesis feed gases which are passed into zone 60 by means of line 61 and distributing means 62. Fresh catalyst may be also introduced into zone 60 by withdrawing the fresh catalyst from a suitable source and introducing the fresh catalyst into line 61 by means of line 63. Operating conditions are adjusted in zone 60 to maintain the catalyst in a fluid ebullient bed, the upper level of which is at point B. Temperature and pressure conditions in zone 60 are adjusted to secure the desired hydrocarbon synthesis. In general, the temperatures are in the range from about 300° F. to about 800° F. and are usually in the range from about 350° F. to 700° F. The pressures, likewise, vary considerably and are a function of other operating conditions, such as, catalyst employed, activity of the catalyst, character of the feed gases and the temperatures utilized. Pressures in the range from about 1 to 100 atmospheres have been suggested. In general, it is preferred that the pressures be in the range from about 50 to 700 pounds.

After a sufficient time of contact, the reaction gases are removed overhead from zone 60 by means of line 64. These gases are passed through cyclone separator or equivalent means 65 wherein any fine entrained particles are removed from the gases and returned to the upper level of the catalyst bed by means of line 66. The catalyst is usually selected from the iron group metals, as for example, iron, cobalt and nickel. The catalysts are utilized either alone or are employed in conjunction with carriers such as kieselguhr, diatomaceous earth, synthetic gels, silica and alumina. Promoters such as oxides of chromium, zinc, aluminum, magnesium, and the rare earth metals are used with the iron group metals.

In these operations the catalyst in zone 60 carbonizes in that the percentage of carbon on the catalyst gradually increases. As this occurs, the density of the catalyst becomes less and its buoyancy becomes greater. Thus, the more highly carbonized catalyst particles and less effective catalyst particles concentrate in the upper area of the fluid bed in zone 60. In accordance with our process we prefer to withdraw catalyst particles from the upper area of the fluid bed in zone 60 by means of conduit 67 and line 68. These particles are passed to zone 30 and handled as hereinbefore described.

By operating as described with respect to Fig. 2, it is possible to subject iron type hydrocarbon synthesis catalysts to a high temperature. In the past this has been accomplished by heating the material in an electric furnace for several hours at high temperatures or by fusing the material between electrodes. Both methods used heretofore require expensive equipment, must be operated by a batch process, and are therefore time consuming. Also, the material tends to lump which necessitates a subsequent grinding or classification operation if the catalyst is to be employed in a fluidized process. In accordance with our process, as specifically described with respect to Figures 1 and 2, it is possible to obtain the same catalytic advantages and further to obtain a powder suitable for immediate use in fluid operations. Also, we have discovered that if the powder is in oxide form it can be readily reduced to iron in the same operation by using a reducing flame or injecting hydrogen into the path of the hot metal oxide particles after they have left the area of the flame.

The catalytic material as pointed out heretofore may be promoted either before or after passage through the torch. For example, pyrites ash may be readily mixed with alumina powder of fine texture in the dry state. The mixture can be impregnated with a solution of potassium carbonate and dried. This dried impregnated powder may be then passed through the torch or flame and subsequently reduced.

We have further discovered that providing the temperature of the flame is increased, it is possible to secure spherical particles. The exact temperature used will of course be a function of the material or catalyst being treated. If the material comprise iron oxide and if spheres are desired the temperature of the torch should be in the range from about 3000° F. to 3500° F. If the material is iron somewhat lower temperatures are satisfactory. The formation of spherical particles does not in any way change the particle size of the pellets fed to the flame. This method is particularly advantageous where it is desired to heat the iron or iron compound to a point where fusion occurs as the advantages of fusion are obtained without sacrificing the fluid properties of the powder.

As pointed out heretofore, our invention is particularly adapted to a process for the manufacture of iron type catalysts suitable for use in a hydrocarbon synthesis process. A specific and very desirable application of our invention is to oxidize the iron type catalyst to a high degree in the oxygen torch flame. For example, we have discovered that if the iron powder is sintered, preferably with promoters at an elevated temperature to oxidize the iron to at least 50% and preferably to 80% of its theoretical value expressed as $Fe_2O_3$, unexpected desirable results are secured. For example, although it is known that catalysts for the hydrocarbon synthesis reaction may be made by sintering iron powder with various promoters at elevated temperatures, the degree of oxidation is not uniform throughout the entire product. Furthermore, the oxygenated and sintered product is not suitable for fluid operations unless grinding and classification of the sintered catalysts are resorted to. In our process we use iron powder commercially ground and promoted with alkali or alkaline earth salts or bases. In accordance with our process, the iron powder is passed through the oxygen flame where it is completely and uniformly oxidized to at least 50% and preferably not less than 80% of its theoretical value expressed as $Fe_2O_3$. In order to secure this high degree of oxidation, it is desirable that a recycling operation be employed.

The process of our invention may be readily understood by the following examples illustrating modifications of the same.

Example 1

A catalyst was prepared by dry mixing finely powdered aluminum oxide with iron powder. This mixture was impregnated with a solution of potassium carbonate so as to obtain 3% alumina and 1% of potassium carbonate on the iron. The mixture was passed through the torch and sintered as described. The powder was separated from the combustion gases and cooled. The effective flame temperature was in the range from 2500° F. to 3500° F.

Example 2

The following three catalysts were prepared by passing iron powder and promoters through a torch as described. The temperature of the torch was about 3000° F. The catalysts were reduced at about 900° F.

Catalyst:
Per cent
1 Iron powder ------------------- 96
   $Al_2O_3$ powder ----------------- 3
   $K_2CO_3$ ----------------------- 1
2 Iron powder ------------------- 91
   $KMnO_4$ ----------------------- 4.45
   Si ---------------------------- 2.27
   $TiO_2$ ------------------------ 2.27
3 Iron powder ------------------- 99
   $Na_2CO_3$ --------------------- 1

Catalyst number 1 was run in hydrocarbon synthesis operations A, B, C, and D.

These runs were compared with runs E, F, G, and H in which a promoted iron catalyst which had been heat treated at 1100° F. to 1200° F. for 23 hours in a conventional manner was utilized. The results of these runs are as follows:

| Catalyst | Number 1 (Heat treated 3000° F.—Torch) | | | |
|---|---|---|---|---|
| Run | A | B | C | D |
| Temp., ° F | 602 | 600 | 599 | 600 |
| Pressure, p. s. i. g | 247 | 249 | 246 | 252 |
| Feed: | | | | |
| $H_2/CO$ | 1.17 | 1.17 | 1.17 | 1.17 |
| Vol. Feed/Vol. Cat./hour | 201 | 200 | 199 | 204 |
| Yields,[1] cc. oil/m.³ $H_2$+CO fed | 94 | 106 | 73 | 78 |
| CO conversion, per cent | 96 | 97 | 94 | |

| Catalyst | Conventional (Heat Treated 1100°–1200° F.) | | | |
|---|---|---|---|---|
| Run | E | F | G | H |
| Temp., ° F | 575 | 575 | 575 | 575 |
| Pressure, p. s. i. g | 250 | 250 | 250 | 250 |
| Feed: | | | | |
| $H_2/CO$ | 1.03 | 1.03 | 1.03 | 1.04 |
| Vol. Feed/Vol. Cat./hour | 848 | 462 | 483 | 454 |
| Yields,[1] cc. oil/m.³ $H_2$+CO fed | 66 | 61 | 64 | 74 |
| CO conversion, per cent | 91.1 | 94 | 94 | 95 |

[1] Yield of hydrocarbon liquid products having four and more carbon atoms in the molecule.

From the above table it is apparent that yields of hydrocarbons having four and more carbon atoms in the molecule are appreciably increased by employing a catalyst prepared according to our process.

In accordance with our process solids or catalysts are sintered, or given a heat treatment, by passing the powdered catalyst through the flame of a suitable torch. In those instances where heat treatment alone is desired, the effective flame temperature may be controlled in the range of 1500 to 2500° F. to accomplish the desired result. If it is desirable to obtain the product in the form of spheres, the effective flame temperature should be maintained above the fusion point of the fusible powder employed. As an example, if an oxide of iron, say magnetite, is being processed into catalyst spheres, an effective flame temperature above 3000° F. should be employed. If the powder to be processed is in the metallic state and is to be oxidized during the process a much lower flame temperature may be employed as the heat of oxidation of the metal is sufficient to provide enough heat to cause partial fusion and result in spherical particles.

The air or oxygen-fuel ratio employed, as well as the type of fuel utilized, will determine the length and effective temperature of the flame. The maximum jet velocity is not critical as long as combustion is accomplished by or near the tip of the torch. The particles do not become fused until they enter the area of the flame somewhere beyond the nozzle 7 as illustrated in Figure 1. It is important, however, that the velocity of the gases in zone 20 be sufficient to keep the particles entrained and not allow them to settle in zone 20. This velocity will vary, depending upon the type of materials being treated. For example, when treating aluminum oxide and iron powder, the velocity should be at least 20 ft. per second. This velocity is, of course, increased considerably as the gases pass through the burner tip 7. It is this increased velocity that prevents the fused particles from adhering to one another. Beyond the flame they cool sufficiently fast so as not to be sticky. In general, the velocities in zone 20 are in the range from about 20 ft. to 100 ft. and higher per second. If desired, additional air may be introduced into the flame area by means of air intake inlets illustrated in Figure 1.

We claim:

1. Improved hydrocarbon synthesis process which comprises introducing synthesis gases comprising carbon monoxide and hydrogen into a reaction zone containing fluidized catalyst selected from the group consisting of iron, cobalt and nickel, maintaining temperature and pressure conditions in said reaction zone to secure the desired synthesis, withdrawing from said reaction zone carbonized catalyst particles, passing the same through an oxygen torch flame, reducing these particles in a reducing atmosphere and returning the same to said reaction zone.

2. Process as defined by claim 1 wherein said catalyst particles in said reaction zone are maintained in a fluidized bed and wherein said particles withdrawn from said reaction zone are withdrawn from the upper area of said bed.

3. Process as defined by claim 1 wherein said particles are oxidized in said torch flame to at least 50% of the theoretical value, expressed as $Fe_2O_3$.

4. Process as defined by claim 1 wherein said particles are oxidized within said torch to at least 80% of the theoretical value, expressed as $Fe_2O_3$.

5. Improved process for the preparation of an oxidized catalyst of desired particle size distribution which comprises preparing a catalyst of desired particle size distribution and then passing the same through an oxygen torch flame under conditions to oxidize the particles, whereby oxidized particles of the desired degree are obtained without any substantial change in particle size distribution.

6. The method set forth in claim 5 in which the oxygen torch has an effective temperature above 3000° F.

GEORGE H. WALDEN.
JERRY A. PIERCE.
MARNELL A. SEGURA.

REFERENCES CITED

The following references are of record in the file of this patent:

UNITED STATES PATENTS

| Number | Name | Date |
|---|---|---|
| 446,988 | Tilghman | Feb. 24, 1891 |
| 1,555,505 | Larson | Sept. 29, 1925 |
| 1,695,041 | Elmen | Dec. 11, 1928 |
| 1,801,382 | Wietzel et al. | Apr. 21, 1931 |
| 2,044,680 | Gilbert | June 16, 1936 |
| 2,151,083 | Christensen et al. | Mar. 21, 1939 |
| 2,231,247 | Bleakley | Feb. 11, 1941 |
| 2,289,731 | Roelen | July 14, 1942 |
| 2,360,787 | Murphree | Oct. 17, 1944 |
| 2,412,025 | Zimmerman | Dec. 3, 1946 |
| 2,416,730 | Arveson | Mar. 4, 1947 |
| 2,417,164 | Huber, Jr. | Mar. 11, 1947 |

FOREIGN PATENTS

| Number | Country | Date |
|---|---|---|
| 21,066 (of 1911) | Great Britain | Sept. 23, 1911 |
| 227,491 | Great Britain | Jan. 20, 1925 |